US006817236B1

United States Patent
Griesser et al.

(10) Patent No.: US 6,817,236 B1
(45) Date of Patent: Nov. 16, 2004

(54) METHOD AND DEVICE FOR CREATING A COMPENSATION VALUE TABLE FOR DETERMINING A TEST VARIABLE, AND FOR IDENTIFYING THE PRESSURE LOSS IN A TIRE OF A WHEEL

(75) Inventors: Martin Griesser, Frankfurt am Main (DE); Hans Georg Ihrig, Darmstadt (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 234 days.

(21) Appl. No.: 10/019,210

(22) PCT Filed: Jun. 2, 2000

(86) PCT No.: PCT/EP00/05033

§ 371 (c)(1),
(2), (4) Date: Dec. 19, 2001

(87) PCT Pub. No.: WO00/78566

PCT Pub. Date: Dec. 28, 2000

(30) Foreign Application Priority Data

Jun. 19, 1999 (DE) .......................................... 199 28 137
Jun. 19, 1999 (DE) .......................................... 199 28 138
Dec. 10, 1999 (DE) .......................................... 199 59 554

(51) Int. Cl.$^7$ ............................................. B60C 23/02
(52) U.S. Cl. ....................................... 73/146.2; 73/146
(58) Field of Search ................................ 73/146, 146.2, 73/146.3, 146.4, 146.5

(56) References Cited

U.S. PATENT DOCUMENTS 5,292,184 A * 3/1994 Takata .......................... 303/147
5,900,543 A * 5/1999 Oshiro ....................... 73/146.2

FOREIGN PATENT DOCUMENTS

| DE | 44 10 941 | 10/1994 |
| DE | 44 26734 | 2/1995 |
| DE | 43 37 443 | 5/1995 |
| DE | 197 21 480 | 11/1998 |

OTHER PUBLICATIONS

Search Report of German Patent Office for Appln 19959554.2.

* cited by examiner

Primary Examiner—Edward Lefkowitz
Assistant Examiner—Alandra Ellington
(74) Attorney, Agent, or Firm—Miller Schwartz & Cohn LLP

(57) ABSTRACT

A method for creating a correction value table for a test variable for identifying the pressure loss in a tire of a vehicle comprises the steps of determining a driving dynamics variable of the vehicle, determining a correction value for the test variable, and storing the said in dependence on the value of the driving dynamics variable that prevailed during the correction value determination. A method of determining a corrected test variable for identifying a pressure loss in the tire of a vehicle comprises the steps of determining a test variable from the wheel radii or from variables that mirror these wheel radii of at least two wheels, preparing a correction value table by means of the method as described hereinabove, determining a driving dynamics variable of the vehicle, reading out of a correction value from the table in accordance with the value of the driving dynamics variable, and correcting the test variable by means of the correction value. A method of identifying the pressure loss in a tire of a wheel comprises the steps of determining a test variable for identifying the pressure loss in the tire of a vehicle by means of the method as described hereinabove, comparing the test variable with a threshold value, and identifying a pressure loss when the test variable reaches or passes the threshold value.

20 Claims, 5 Drawing Sheets

METHOD AND DEVICE FOR CREATING A COMPENSATION VALUE TABLE FOR DETERMINING A TEST VARIABLE, AND FOR IDENTIFYING THE PRESSURE LOSS IN A TIRE OF A WHEEL

TECHNICAL FIELD

The present invention relates to a method and a device for creating a correction value table, for determining a test variable, and for identifying the pressure loss in a tire of a wheel.

BACKGROUND OF THE INVENTION

A method for identifying pressure loss of this type is disclosed in DE 19 721 480 A1.

Basic physical correlations are explained by way of FIG. 6. Reference numeral 61 represents a regular wheel on the roadway 60. The wheel center 63 moves with the vehicle chassis and, thus, at the vehicle speed Vf. Corresponding to the generally accepted relationship between the track speed v of a point on a disc rotating with the angular speed $\omega$, with the said point being spaced from the center of rotation by the radius R, i.e., $\omega=v/R$, $\omega r=vF/Rr$ results on the left side of FIG. 6. The angular velocity $\omega$ of vehicle wheels can be determined by means of wheel sensors, while the vehicle speed v generally cannot be sensed by sensors. The dynamic rolling circumference of a wheel varies in the event of pressure loss. The wheel rotates faster compared to the normal condition or compared to the wheel without pressure loss.

Additional effects can influence the angular velocities of the wheels, but the resulting difference between the angular velocities of individual wheels would not indicate pressure loss in any one of the wheels. Examples herefor are traction slip, different geometries during cornering, unsymmetrical load distribution in the vehicle, or similar factors. Two effects which result drom driving dynamics, especially during cornering or in the traction case, will be explained referring to FIGS. 1A to 1C.

FIG. 1A shows a vehicle 10 with left front wheel 11, right front wheel 12, right rear wheel 13, and left rear wheel 14. The vehicle rides at a speed vF in a curve to the right, and it is assumed that the vehicle's point of gravity S follows the radius R about the center M. The wheels 12 and 13 on the right-hand side of the vehicle roll on the inner track and, therefore, have a track with approximately the same smaller inside radius Ri, while the wheels 11 and 14 on the left-hand side of the vehicle roll on the outer track and, hence, ride in a curve with the larger outside radius Ra. Because they have to cover a larger distance in the same time, the curve-outward wheels 11 and 14 exhibit a higher track speed and, thus, also a higher angular velocity than the curve-inward wheels 12 and 13. However, these differences are not due to a pressure loss in any one of the wheels.

Another effect is explained with reference to FIG. 1B. The vehicle shown in FIG. 1A is shown from the back, it follows the same track as the vehicle shown in FIG. 1A (curve to the right, i.e., to the right into the drawing plane in FIG. 1B) about the center M with radius R. A centrifugal force Fz which is applied to the vehicle point of gravity S is produced due to the cornering maneuver. The counterforce is the friction force Fr between the vehicle wheels and the roadway. Because these forces do not act in the same plane, a rolling moment Mr is produced in the mentioned situation counterclockwise about the longitudinal axis of the vehicle.

This brings about that the curve-outward wheels 11 and 14 are subjected to greater stress than the curve-inward wheels 12 and 13. The result is that they are more compressed, hence show a smaller dynamic rolling radius and a higher angular velocity. The effect of FIG. 1B points to the same direction as the one described by way of FIG. 1A so that they add.

FIG. 1C shows a situation in which the vehicle 10 moves on the roadway 15 driven by engine 16. In the example of FIG. 1 the rear axle is driven so that the wheels 13, 14 of this axle will exhibit both traction slip and brake slip, while the wheels of the front axle 11, 12 can only exhibit brake slip. Especially in the case of traction, the wheels 11, 12 of the front axle roll freely and, hence, have an angular velocity $\omega=vF/R$, while the wheels of the rear axle frequently have a higher amount because the wheel slip $\omega s$ adds to the above-mentioned amount $\omega$. Likewise this effect has nothing to do with different angular velocities due to pressure loss in any one of the tires.

In view of the above, it is important to eliminate disturbing effects according to FIGS. 1A to 1C. In this respect, DE 19 721 480 A1 discloses a method wherein wheel speeds are added in pairs, the sums are brought into a relation to each other, and the value of the quotient is checked. More particularly, a method is disclosed wherein the wheel speeds of the wheels lying on a diagonal are added and the results achieved are divided. A quotient will thus be calculated which differs more or less from the ideal value 1 (constant velocity of all wheels). When especially a tire with pressure loss exists, a considerably lower value will occur either in the numerator or the denominator of the fraction so that, for this reason, the resulting quotient will also differ greatly from the ideal value 1, upwards or downwards. Further tests may then be performed in order to detect a wheel with pressure loss, if there is one. Effects of curve geometries or traction slip are frequently compensated by considering or summing the values of diagonally opposite wheels. On the other hand, this compensation not always occurs with certainty so that comparatively wide tolerances must be chosen to avoid wrong detections. The result is that the detection occurs only at a relatively late point. During cornering maneuvers, for example, differential locks may prevent the compensation of effects due to different curve geometries. When one axle is locked, the wheels of the axle roll with the same track speed and angular velocity so that they cannot contribute to compensating the unbalance in the summation to the respective other partner.

BRIEF SUMMARY OF THE INVENTION

An object of the present invention is to provide a method and a device for creating a correction value table, for determining a test variable, and for identifying the pressure loss in a tire of a wheel, permitting a reliable detection of pressure drop in a tire.

This object is achieved with a method for creating a correction value table, for determining a test variable, and for identifying the pressure loss in a tire of a vehicle, wherein the test variable is a quotient of each two sums of two wheel radii or variables mirroring these wheel radii, comprising the steps determining a driving dynamics variable of the vehicle, and determining a correction value for the test variable and storing the said in dependence on the value of the driving dynamics variable which prevailed during the correction value determination.

In the method for creating a correction value table for a test variable for identifying a pressure loss in the tire of a vehicle, individual correction values are determined for the test value and stored in dependence on the value of a driving dynamics magnitude which prevailed during or at the point of time of the correction value determination. A table of correction values is this way prepared in the course of time. The input variable of the table is the driving dynamics variable, the output value is thus a driving-dynamics responsive correction value so that the test variable for identifying a pressure loss in the tire of a vehicle can be corrected in dependence on driving dynamics.

The determination of the correction value is a learning operation. The correction value can be determined when the vehicle dynamics, in particular the driving dynamics variable satisfies defined conditions with respect to their values or with respect to their time variations, no matter whether absolute or relative. More particularly, the demand may be that the vehicle dynamics or especially the driving dynamics variable referred to has a certain constancy (within a range of values within a time window), or that the variation of driving dynamics is lower than a threshold value. The test variable may be determined from several wheel radii or quantities which correspond to these wheel radii. For example, the test variable may be a quotient of two sums of two wheel radii each.

The possible range of values of the driving dynamics variable can be subdivided into ranges. When the value of the driving dynamics variable is represented digitally, the range division may occur already due to the digital quantization. Correction values may be determined as described hereinabove for individual or several values of the driving dynamics variable. For other values of the driving dynamics variable, correction values may be determined by interpolation with appropriate methods (linear, in general polynomial).

The driving dynamics variable may be a wheel torque and/or a curve characteristic value. The test variable may be determined from the variables of several wheels of the vehicle. In particular, it may be the quotient of two sums of such variables.

DETAILED DESCRIPTION OF THE PREFERRED EMBODIMENTS

Figure 3:
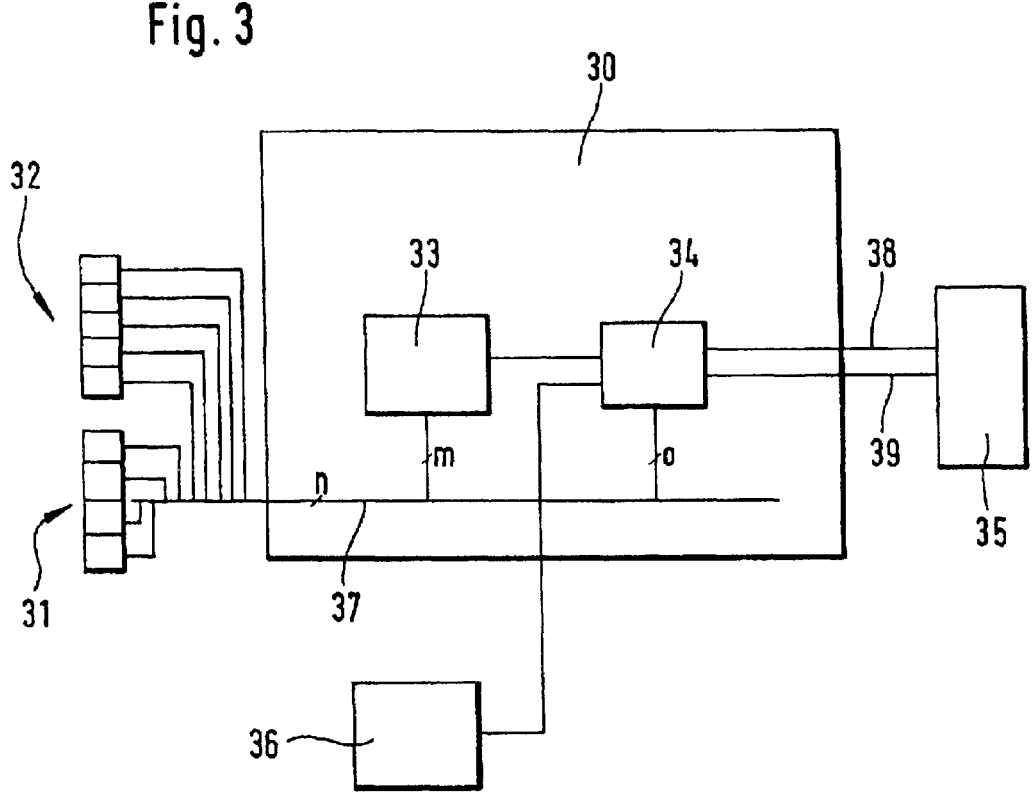
FIG. 3 is a block diagram of a device for creating correction value tables.

In the embodiment of FIG. 3, reference numeral 30 generally designates the device for preparing a correction value table. Said device receives sensor signals from sensors 31 and 32, and reference numeral 31 designates the four wheel sensors (one on each wheel), reference numeral 32 designates further sensors such as acceleration sensor, yaw rate sensor, steering angle sensor, transmission sensor, engine rotation sensor, and similar elements in FIG. 3. In general, digital data are concerned which have already passed through various conditioning stages (conversion, filtering, standardization). The data can be tapped by a vehicle data bus 37.

Reference numeral 33 represents a first determination device for determining a driving dynamics variable. The first determination device 33 may receive especially the wheel signals and, as the case may be, further sensor signals or status variables from other control components and may determine therefrom the driving dynamics variable of the vehicle. For example, device 33 may determine a wheel torque and/or a curve characteristic value.

The first determination device 33 determines the value of the driving dynamics variable generally also as a digital variable. A range division of the maximum possible value range of the driving dynamics variable follows already due to this quantization which results from digitizing. The range division may be more or less coarse, as desired. In the event of a curve characteristic value, it may be sufficient to select three ranges, i.e., left, straight, and right. Of course, finer gradings are also feasible. Equally the same applies when the driving dynamics variable is the drive torque. There may be embodiments where the method described is effected only in a traction case (wheel torque is greater than zero) because it may be assumed in this case that the non-driven wheels roll freely.

In another embodiment, the method is used in the unclutched case, or in the no-traction and no-braking case (wheel torque is roughly 0) when all wheels roll freely.

Reference numeral 34 represents a second determination device for determining a correction value and for storing the said in a memory 35 in dependence on the value of the driving dynamics variable which prevailed during the determination of the correction value. The second determination device 34 may also receive the wheel signals and further sensor signals. It will perform comparatively complex testing and determining operations. Device 34 itself may receive the test variable to be corrected (represented by block 36). In the second determination device 34, time variations (e.g. derivative, fluctuation within a time window) of the test variable 36 and/or the driving dynamics variable from the first determination device 33 or values of these variables can be tested as to whether they exceed threshold values or remain under them. The second determination device 34 finally determines a correction value for the test variable. The correction value is determined for a defined value of the driving dynamics variable so that it is generally demanded that the driving dynamics variable remains within the value range considered or leaves said only briefly or only insignificantly during the determination of the correction value.

After the determination of the correction value, the said is registered in the memory 35 in dependence on the value of the driving dynamics variable. The (digital) value of the driving dynamics variable may serve as an address of the memory location or can be taken into account for the address determination. Reference numeral 38 represents a data line for the correction value, 39 refers to an address line on which the driving dynamics variable mirrors.

The individual items of the table are determined as they are available. The adjustment of the driving dynamics variable is generally achieved from the condition adjusted by the driver. A correction value is determined for the respectively prevailing value of the driving dynamics variable if the other conditions permit so. The determined correction value is then written in the corresponding table position. This way, a table is prepared in the course of time. For defined values of the driving dynamics variable, correction values can be extrapolated from determined correction values which apply to other values of the driving dynamics variable, for example, by linear or quadratic extrapolation. Extrapolated values may later be overwritten by determined values.

Correlations between a curve characteristic value and a test variable are determined and stored in one embodiment of the correction value table.

In general, the determination of correction values is a learning process wherein it is ensured also by testing conditions which are due to driving situations that only the desired error variable but no other variables are represented in the learnt correction value.

The memory 35 may be a volatile memory whose values get lost when the current supply is switched off (deactivation of the vehicle or removal of said's battery). But the memory may also be a non-volatile memory so that the learnt values in the memory 35 survive an interruption of the current supply.

The stored correction values serve for the correction of a test variable for the tire pressure. The test variable may be so that it qualitatively furnishes a hint at the existence of a pressure loss at any one of the vehicle wheels, but does not yet give a specific hint as to which wheel actually suffers from pressure loss. More particularly, the test variable may be a variable whose value is determined from the wheel radii of at least two wheels. Instead of the wheel radii, variables mirroring these wheel radii, e.g. the wheel speeds, may be used. Several qualitatively different test variables may prevail so that also several different correction value tables would have to be created.

The test variable may be a quotient of two sums, and each sum is calculated of the wheel radii of two of the four wheels of the vehicle. The sums contain pairwise different wheel radii. One sum may be produced from the wheel radii at the front of the vehicle, and the other one may be produced from the wheel radii at the rear of the vehicle. The quotient of these two sums forms a test variable for which, as described above, in dependence on the value of the driving dynamics variable, correction values are determined in order to develop a correction value table whose input value is the value of the driving dynamics variable.

A qualitatively different test variable may be produced as a quotient of a sum of the wheel radii on the left side of the vehicle and of a sum of the wheel radii on the right side of the vehicle.

A wheel which decreases due to tire pressure loss and, consequently, rotates faster will cause a discrepancy of the resulting quotient from the standard value in all the mentioned test variables so that the tire pressure loss can be detected from this discrepancy.

The driving dynamics variable may be a wheel torque or a variable which was determined with respect to one or more wheel torques (e.g. average value, maximum, or minimum). A wheel torque can be determined with respect to an e.g. measured engine output torque and the gear ratio prevailing between engine and wheel. It is principally possible to derive the engine torque from the indexed engine torque-friction torque.

The gear ratio can be determined from the engine speed and the wheel speed. An unclutched condition is taken into account acccordingly. This information may be made available by way of a data bus, or this information may be obtained from plausibility considerations.

The friction torque of engine and transmission may also be considered in the determination of the wheel torque.

The driving dynamics variable may also be a curve characteristic value. Especially, one or more of the following variables may be taken into account in this connection: the yaw rate (angular speed about the vertical axis, from sensor or determination device), the curve radius in connection with the vehicle speed or the vehicle acceleration, the steering angle in connection with the vehicle speed or the vehicle acceleration, the transverse acceleration (from sensor or determination device). The curve characteristic value can be determined from the wheel signals and/or from other sensor signals or signals found. The curve characteristic value can be produced redundantly. The determination of the curve characteristic values may be designed so that it primarily operates with reference to the wheel signals, however, that the determination of curve characteristic values is effected with reference to other signals, when e.g. a wheel signal is disturbed. In as far as the curve characteristic value is determined with reference to signals from a yaw rate sensor and/or acceleration sensor, provision must be made that backward travel of a vehicle will not cause errors. In case of need, signs must be reversed.

The preparation of the correction value table may also be made dependent on general conditions. For example, it may be made at or after defined kilometer readings. It may also take place upon the request of a driver. Generally, conditions may be chosen which prevent that actual tire pressure losses are learnt as correction factors which could cause non-detection of a tire pressure loss. On the other hand, the time variation of the individual correction values can be monitored. When a correction value changes continuously in one direction within a defined duration (e.g. during two hours) and/or within a defined distance (e.g. within 150 km), this may be an indication that an actual pressure loss is erroneously learnt as a correction value. This may then lead to an alarm.

Figure 2A:
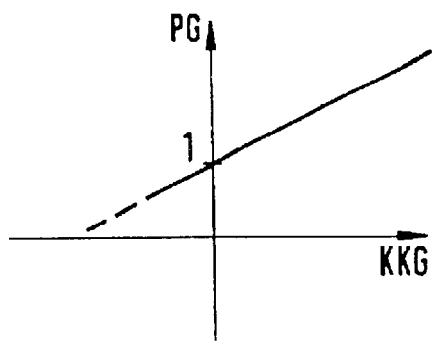
FIG. 2 shows representations of ideal and real variations of test variables.
Figure 2A:
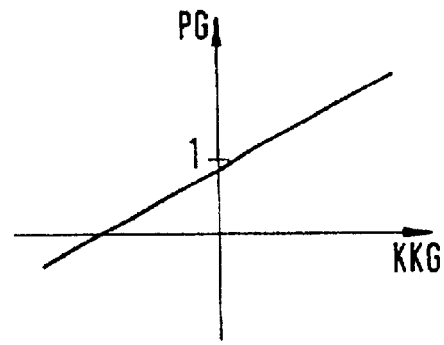
Figure 2B:
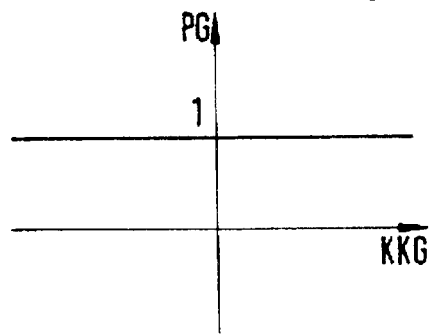
Figure 2B:
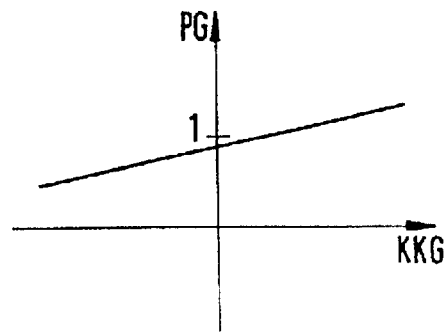
Figure 2C:
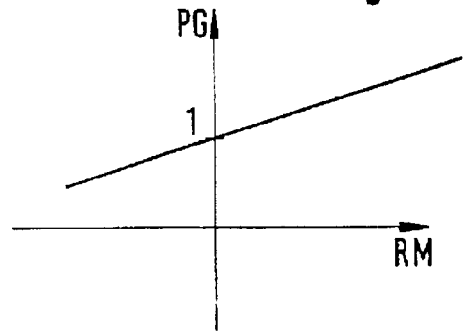
Figure 2C:
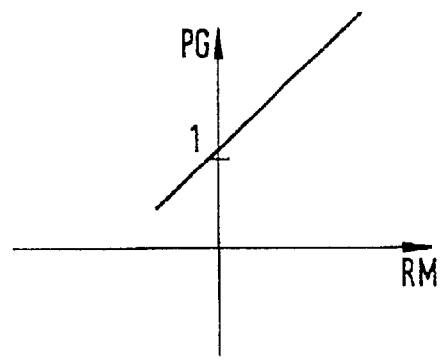

FIGS. 2A to 2C show ideal and real variations of different test variables PG in dependence on different driving dynamics variables, i.e., in dependence on the curve characteristic value KKG (FIGS. 2A and 2B) or in dependence on the wheel torque RM (FIG. 2C).

Figure 1A:
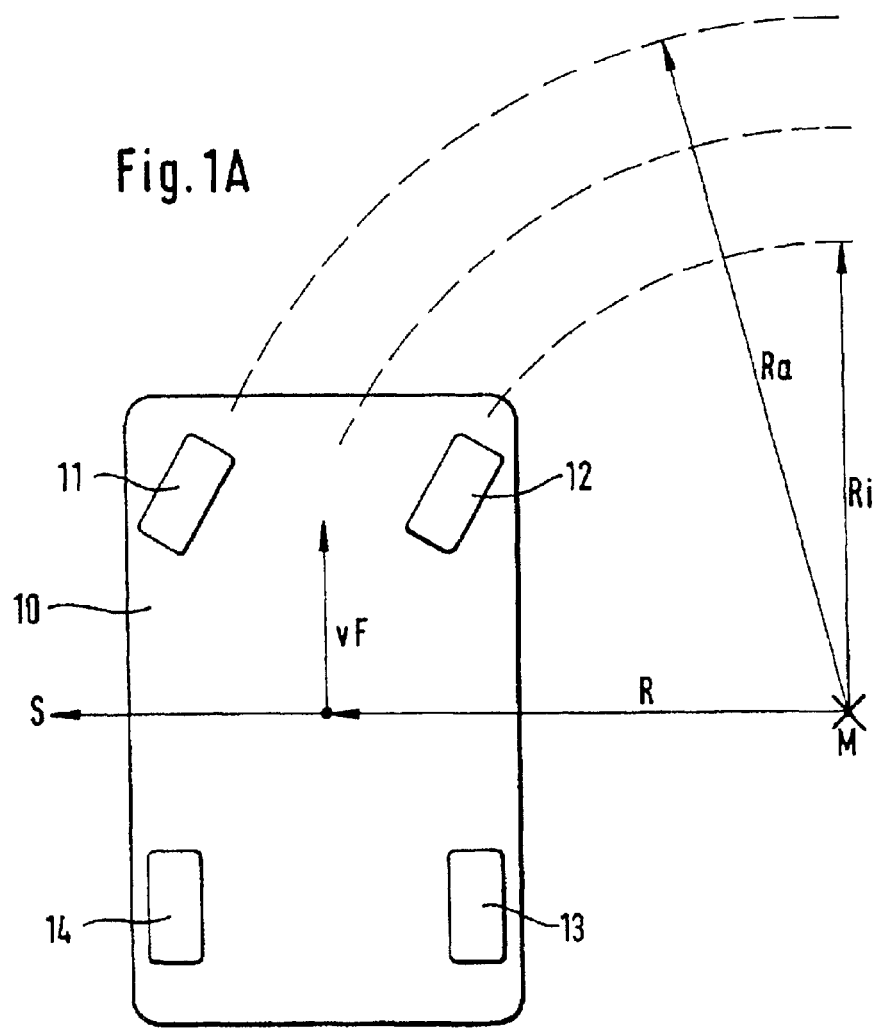
FIGS. 1A to 1C show views to explain the influence of disturbances.
Figure 1B:
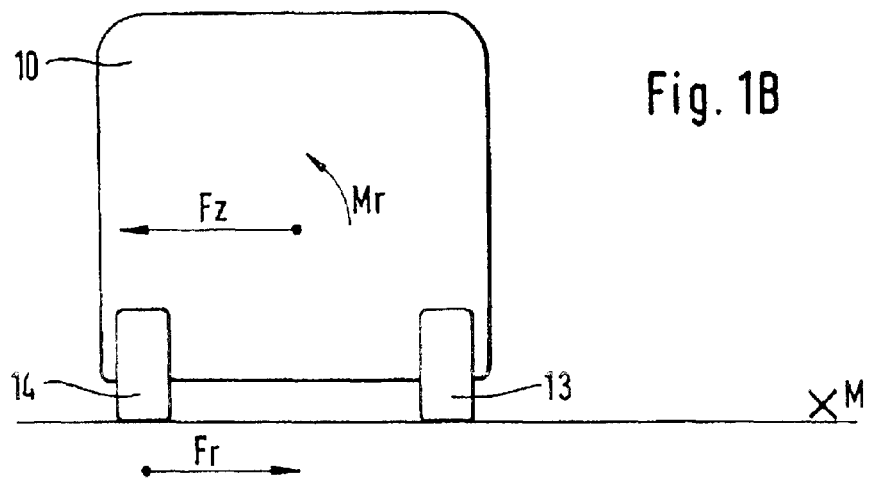
Figure 1C:
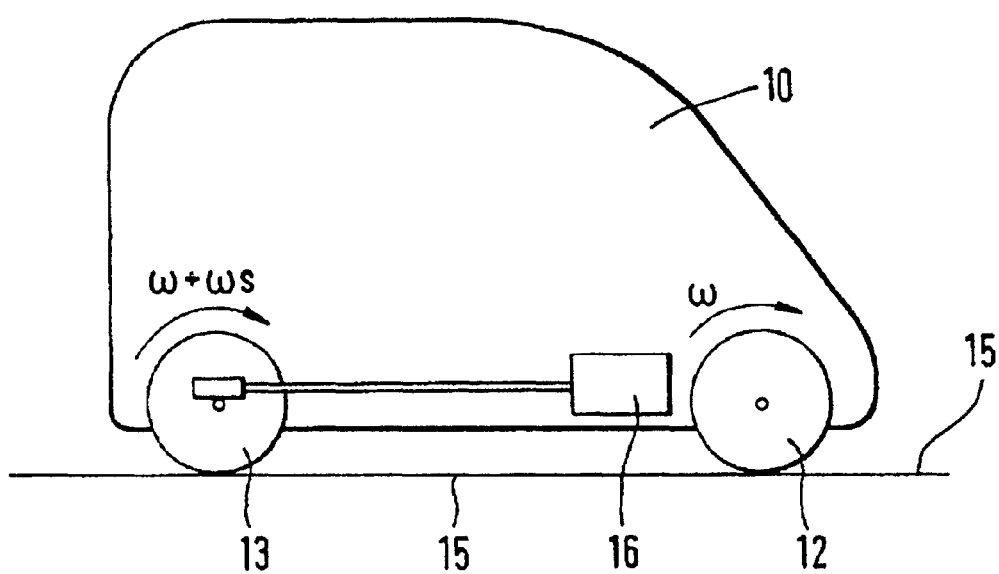

FIG. 2A shows on the left side the ideal variation of a test variable which was calculated as follows:

$$PG = \frac{r11 + r14}{r12 + r13}$$

wherein the values r are wheel radii or corresponding values (e.g., angular velocity, and it must then be considered that they behave inversely to the radii), and the numerals are assigned to identify the individual wheels corresponding to the reference numerals in FIG. 1A. In the ideal variation (left), the test variable PG adopts the value 1 with a curve characteristic value 0 (straight travel) because ideally all wheels rotate equally quickly at like wheel radii so that numerator and denominator adopt the same value and said's quotient adopts the value 1. However, the real variation is different for most various reasons, and namely both with respect to the zero point and with respect to the gradient. The latter is illustrated on the right in FIG. 2A. The test variable no longer runs through point 0/1, for example, due to differently worn tires or an unsymmetrical vehicle loading, and also the gradient may be different. It is principally pointed out that the curve characteristic value is represented only qualitatively. The variation does not have to be similar to a straight line. However, a monotonous behavior (rising or declining) must be expected over the curve characteristic value which eventually mirrors the different wheel speeds due to the geometrical correlations explained in FIG. 1A.

FIG. 2B shows the ideal and real variation of the test variable PG which was determined as follows:

$$PG = \frac{r11 + r13}{r12 + r14}$$

In this case, the values of the diagonals were respectively added and the sums are calculated to form the quotient. In the ideal variation (FIG. 2B left), the different geometry conditions are neutralized so that a straight course through the point 1 on the ordinate would have to be expected. In this case, too, other real variations will be caused due to different disturbances which are not due to pressure losses. One example is shown on the right in FIG. 2B. Again, the test variable does not run through the point 0/1 and may have a determined gradient also in this case, and again it must be pointed out once more that it is not necessarily a straight line that represents the correct variation of the test variable.

FIG. 2C shows the variation of the test variable PG in dependence on the wheel torque, and the test variable was determined as follows:

$$PG = \frac{r11 + r12}{r13 + r14}$$

Inasfar as only the traction case (wheel torque is considered as positive) is looked at, a characteristic curve variation results only for positive wheel torques. In the ideal variation (FIG. 2C left) the value 1 results for the wheel torque 0 because then all wheels with the same radius run freely and, thus, equally quickly so that identical values are achieved in the numerator and the denominator of the fraction. Herein, too, discrepancies may occur in the real case (FIG. 2C right). In the non-traction case, the value is not required to be at zero, and also the further variation (e.g. the gradient of a straight line) may be different (see FIG. 2C right). In an overrun condition, a characteristic curve variation occurs only for negative wheel torques.

The real variations shown on the right side in FIGS. 2A to 2C show discrepancies from the ideal variation which take place due to secondary disturbances of most different causes (worn tires, unsymmetrical loading condition of the vehicle), which apart from the primary disturbances (curve geometry, rolling moment, traction slip) may cause discrepancies of the test variable from the ideal variation which have nothing to do with a pressure loss in a tire that will possibly be detected. These further coefficients of influence are eliminated by learning the correction values.

Figure 4:
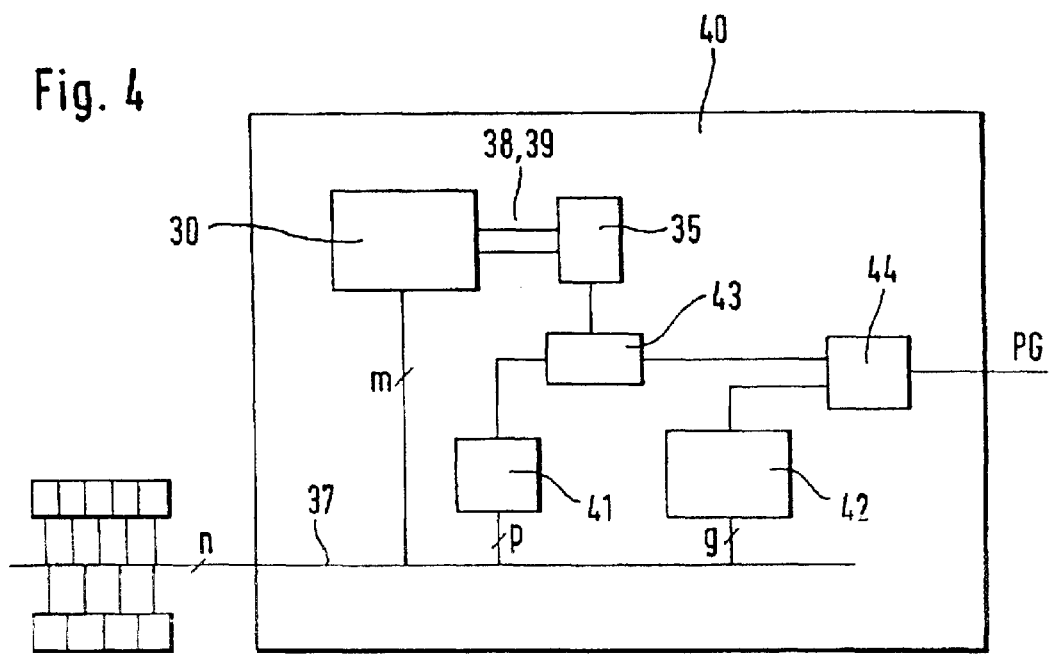
FIG. 4 is a block diagram of a device for determining a test variable for the tire pressure.

FIG. 4 shows a device for determining a test variable for the tire pressure in the tires of a vehicle. It includes a preparation device 30 for preparing a correction value table, stored in memory 35 for the test variable. The preparation device 30 can be designed as described hereinabove or as illustrated in FIG. 3. Further, the test variable determination device includes a second determination device 41 for determining a driving dynamics variable. This variable is that driving dynamics variable which is required as an input quantity for the correction value table stored in memory 35. The second determination device 41 may be the same as the first determination device 33.

A third determination device 42 determines the driving dynamics variable in a conventional fashion, for example, by determining the variable with reference to the wheel radii of several wheels. Methods known in the art may be used for this purpose. The quotients described above can be calculated from sums.

A reading device 43 reads a correction value from the correction value table in the memory 35 in accordance with the driving dynamics variable determined in the second determination device 41.

A correction device 44 corrects the value of the test variable determined by the second determination device 41. The correction value may be an additive value or a factor by which the determined value is added or multiplied. When the test variable is the quotient of two 'symmetric' sums, the ideal value amounts to 1. A real value can differ therefrom and e.g. amount to 0.97. By using the correction value, the value of the test variable would be caused to reach e.g. 1.00 again.

Figure 5:
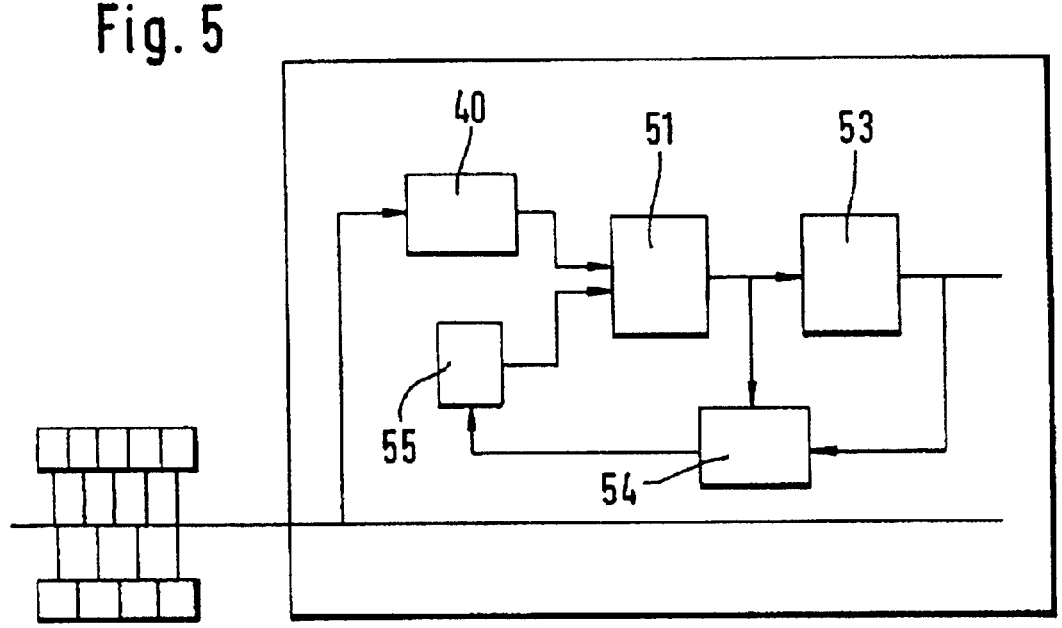
FIG. 5 is a device for identifying the pressure loss in a tire of a wheel.
Figure 6:
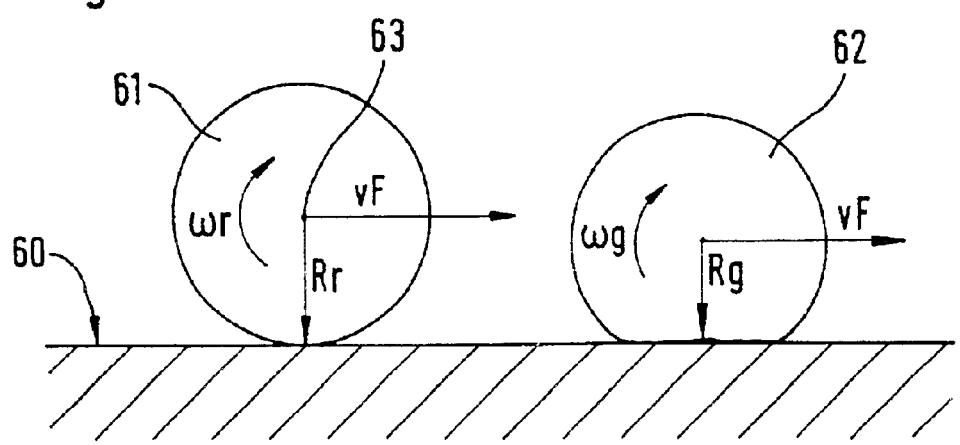
FIG. 6 is a representation for explaining physical correlations.

FIG. 5 shows a device for identifying the pressure loss in a tire of a wheel. The identification device includes a determination device 40 for determining a test variable for the tire pressure. The determination device can be designed as described hereinabove and especially as shown schematically in FIG. 4. It determines a corrected test variable, and the said test variable is determined with reference to wheel radii of several wheels of the vehicle.

Besides, the identification device includes a comparison device 51 which compares the corrected test variable with one or more threshold values. A discrepancy which still exists after the correction would be an indication that either the numerator or the denominator of the fraction due to pressure loss shows a changed value so that, accordingly, the quotient changes as well. Because the change may be in the numerator or in the denominator, the test variable can be tested with respect to whether it exceeds a top threshold value that lies above the standard value and with respect to whether it remains under a bottom threshold value that lies below the standard value. The threshold values are represented by reference numeral 55. In these threshold value tests, too, time considerations may be performed to prevent that single runaways of the corrected test variable will cause wrong identifications. Likewise the test variable itself (corrected or not corrected) may still be subject to processing operations, for example, filtering or smoothing e.g. by low-pass filtering or averaging over a time window. The time consideration during the threshold value test which is performed in a characteristic curve device 53 may comprise the checking operation whether the 'runaway condition' lasts longer than a defined duration or, within a defined first period, lasts longer than a defined shorter second period in total.

When finally the result is that the test variable has reached or passed a threshold value, this is a first indication of the existence of pressure loss. Inasfar as the test variable is determined with reference to the wheel radii of several wheels of the vehicle, this test does not yet permit gathering which wheel actually suffers from the pressure loss. However, it can be concluded from the information about whether the variable has exceeded the top threshold value or remained under the bottom threshold value which wheel pair suffers from pressure loss. As the case may be, a qualitatively different test variable may then be used to determine the exact wheel where pressure loss prevails.

Both the determination of correction values and the determination of test variables and the pressure loss identification may be effected speed-responsively. The vehicle speed may thus be another table input when the correction value table is prepared.

When the result of a checking operation is that the test variable has reached or passed a threshold value, this can be considered as a first assumption of pressure loss. The further procedure may be that, based on this assumption, the test threshold values are changed by way of a modification device 54 so that the pressure loss identification is less sensitive. If then, preferably within a determined time or path window, the modified threshold value is again reached or passed, pressure loss identification is affirmed, and an alarm is triggered.

If the curve characteristic value is a wheel torque, the test variable may be the quotient of the sum of the wheel radii at the front and the sum of the wheel radii at the rear axle. With the first assumption of a pressure loss, the threshold values can be influenced so that the threshold values on the driven axle are modified differently for further identification operations than those on the non-driven axle. The modification may also be effected in dependence on the wheel torque and/or the gear step of the vehicle.

What is claimed is:

1. Method for creating a correction value table, for determining a test variable, and for identifying the pressure loss in a tire of a vehicle, wherein the test variable is a quotient of each two sums of two wheel radii or variables mirroring these wheel radii, comprising the steps of:
   determining a driving dynamics variable of the vehicle, and
   determining a correction value for the test variable and storing the said in dependence on the value of the driving dynamics variable which prevailed during the correction value determination,
   wherein the correction value determination takes place only when the vehicle dynamics with respect to their time variations satisfies defined conditions,
   wherein one sum is produced with reference to variables on wheels of the right vehicle side and the other sum is produced with reference to variables on wheels of the left vehicle side.

2. Method as claimed in claim 1, wherein the correction value determination takes place only when the vehicle dynamics with respect to their values satisfies defined conditions.

3. Method as claimed in claim 2, wherein the correction value determination or storage takes place only when the vehicle dynamics has remained within a defined value range for a defined period of time.

4. Method as claimed in claim 1, wherein the test variable is determined from the wheel radii or from variables mirroring these wheel radii of at least two wheels.

5. Method as claimed in claim 1, wherein one sum is produced with reference to variables on front wheels of the vehicle and the other sum is produced with reference to variables on rear wheels of the vehicle.

6. Method as claimed in claim 1, wherein one sum is produced with reference to variables on the wheels on the one vehicle diagonal and the other sum is produced with reference to variables on wheels of the other vehicle diagonal.

7. Method as claimed in claim 1, wherein the correction values are determined for several values of the driving dynamics variable, and correction values are extrapolated from the determined correction values for other values of the driving dynamics variable.

8. Method as claimed in claim 1, wherein the driving dynamics variable is a wheel torque which is determined from the engine torque and the gear ratio.

9. Method as claimed in claim 8, wherein the gear ratio is determined from the engine speed and the wheel speed.

10. Method as claimed in claim 1, wherein the driving dynamics variable is a curve characteristic value acquired during cornering maneuvers.

11. Method as claimed in claim 10, wherein as the curve characteristic value, one or more of the following variables can be taken into account:
   the yaw rate, also in connection with the vehicle speed or acceleration,
   the curve radius in connection with the vehicle speed or the vehicle acceleration,
   the steering angle in connection with the vehicle speed or the vehicle acceleration,
   the transverse acceleration, also in connection with the vehicle speed or acceleration.

12. Method as claimed in claim 11, wherein the correction value is stored in dependence on several curve characteristic values.

13. Method of identifying the pressure loss in a tire of a wheel, comprising the steps of:
   determining a test variable for identifying pressure loss in the tire of a vehicle,
   comparing the test variable with a threshold value, and
   identifying pressure loss when the test variable reaches or passes the threshold value,
   wherein when pressure loss is assumed at any one of the driven wheels, the threshold value is modified so that the pressure loss identification becomes more sensitive.

14. Device for preparing a correction value table for a test variable for identifying the pressure loss in the tire of a vehicle, comprising:
   a first determination device for determining a driving dynamics variable of the vehicle, and
   a second determination device for determining a correction value and storing the said in a memory in dependence on the value of the driving dynamics variable which prevailed during the determination of the correction value.

15. Device for determining a corrected test variable for the pressure in the tires of a vehicle, comprising:
   a first determination device for determining a test variable for the tire pressure,
   a preparation device for preparing a correction value table for a test variable,
   a second determination device for determining the driving dynamics variable,
   a reading device for reading out a correction value in accordance with the driving dynamics variable from the table, and
   a correction device for correcting the test variable in accordance with the read-out correction value.

16. Device for identifying the pressure loss in a tire of a wheel, comprising:
   a determination device for determining a test variable for the tire pressure in the tires of a vehicle,
   a comparison device for comparing the test variable with a threshold value,
   an identification device for identifying a pressure loss when the test variable reaches or passes the threshold value, and
   a modification device which changes the threshold value accordingly when a pressure loss is assumed.

17. Method for creating a correction value table, for determining a test variable, and for identifying the pressure loss in a tire of a vehicle, wherein the test variable is a quotient of each two sums of two wheel radii or variables mirroring these wheel radii, comprising the steps of:
   determining a driving dynamics variable of the vehicle, and determining a correction value for the test variable and storing the said in dependence on the value of the driving dynamics variable which prevailed during the correction value determination, wherein the correction value determination takes place only when the vehicle dynamics with respect to their time variations satisfies defined conditions, wherein one sum is produced with reference to variables on the wheels on the one vehicle diagonal and the other sum is produced with reference to variables on wheels of the other vehicle diagonal.

18. Method for creating a correction value table, for determining a test variable, and for identifying the pressure loss in a tire of a vehicle, wherein the test variable is a quotient of each two sums of two wheel radii or variables mirroring these wheel radii, comprising the steps of:

determining a driving dynamics variable of the vehicle, and determining a correction value for the test variable and storing the said in dependence on the value of the driving dynamics variable which prevailed during the correction value determination, wherein the driving dynamics variable is a wheel torque which is determined from the engine torque and the gear ratio, wherein the gear ratio is determined from the engine speed and the wheel speed.

19. Method for creating a correction value table, for determining a test variable, and for identifying the pressure loss in a tire of a vehicle, wherein the test variable is a quotient of each two sums of two wheel radii or variables mirroring these wheel radii, comprising the steps of:

determining a driving dynamics variable of the vehicle, and determining a correction value for the test variable and storing the said in dependence on the value of the driving dynamics variable which prevailed during the correction value determination.

wherein the driving dynamics variable is a curve characteristic value acquired during cornering maneuvers.

20. Method as claimed in claim 19, wherein as the curve characteristic value, one or more of the following variables can be taken into account:

the yaw rate, also in connection with the vehicle speed or acceleration, the curve radius in connection with the vehicle speed or the vehicle acceleration, the steering angle in connection with the vehicle speed or the vehicle acceleration, the transverse acceleration, also in connection with the vehicle speed or acceleration.

* * * * *

UNITED STATES PATENT AND TRADEMARK OFFICE
CERTIFICATE OF CORRECTION

PATENT NO. : 6,817,236 B1
DATED : November 16, 2004
INVENTOR(S) : Martin Griesser et al.

It is certified that error appears in the above-identified patent and that said Letters Patent is hereby corrected as shown below:

Title page,
Item [75], Inventor, please change "Hans Georg Ihrig" to -- Hans-Georg Ihrig --.
Item [74], *Attorney, Agent or Firm*, "Miller Schwartz & Cohn LLP" to -- Honigman Miller Schwartz & Cohn LLP --.

Column 19,
Line 11, change "correction value determination." to -- correction value determination, --.

Signed and Sealed this

Nineteenth Day of July, 2005

JON W. DUDAS
*Director of the United States Patent and Trademark Office*